Jan. 8, 1957     M. H. FOSS     2,777,099
POLE STRUCTURE OF MAGNETS
Filed Aug. 26, 1955
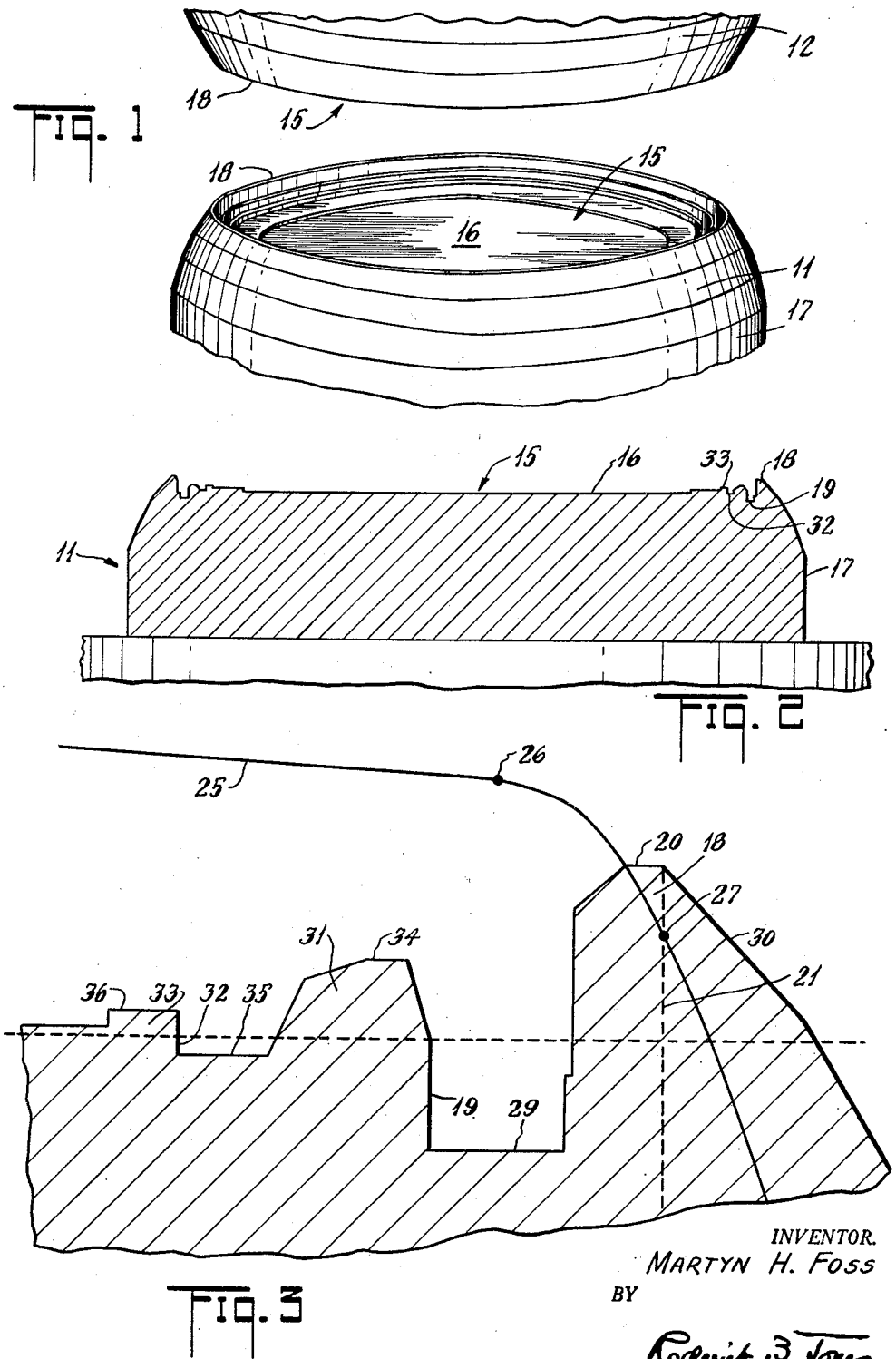
INVENTOR.
MARTYN H. FOSS
BY
Roderick B. Jones
ATTORNEYS

United States Patent Office 2,777,099
Patented Jan. 8, 1957

2,777,099

POLE STRUCTURE OF MAGNETS

Martyn H. Foss, Township of Downers Grove, Du Page County, Ill., assignor, by mesne assignments, to the United States of America as represented by the Secretary of the Navy Application August 26, 1955, Serial No. 530,922

2 Claims. (Cl. 317—158)

This invention pertains to the art of magnets, and is embodied in the pole structure thereof. Embodiment of the invention increases the useful fraction of the magnetic flux in the gap of a magnet.

The magnetic field in the gap between opposed faces of opposite-polarity poles of a magnet is not of uniform strength throughout the areas of the gap. Flux density decreases particularly near the edges of the poles. In apparatus that requires predetermined strength characteristics in a magnetic field, and controlled flux characteristics throughout the area of the field, the characteristic of the flux density being naturally non-uniform presents design problems for attaining desired field characteristics in the magnet.

Applicant has devised structure of the opposed faces of the poles of a magnet being contoured irregularly, instead of square in accordance with prior-art practice that is general. Under practice of the present invention, the particular contour of the pole faces of a magnet is constructed to attain a flux density in the gap between pole faces, and a distribution of magnetic strength throughout the area of the gap, that is desired in the magnet with reference to the needs of its use. Applicant attains an optimum of control of the magnetic flux throughout the area of the pole face, and particularly towards the edges of the poles. The particular contour of the pole faces in any particular magnet will vary in accordance with the particular magnetic characteristics that are desired.

The magnet of the disclosure presents one practical embodiment of the invention, and illustrates the principles thereof. The disclosed structure was devised for an electromagnet of a particular cyclotron, which operates satisfactorily, and the efficiency of which is improved thereby.

In the drawing,

Fig. 1 is a fragmentary perspective of a magnet embodying the invention,

Fig. 2 is a cross-sectional elevation of one of a pole piece of the magnet of Fig. 1, taken in a longitudinal center-plane thereof, and Fig. 3 is a fragmentary detail of the structure shown in Fig. 2, on a greatly enlarged scale.

The magnet of Fig. 1 comprises pole pieces 11 and 12, presenting poles of opposite, north and south, polarity. The disclosed structure is pole pieces of an electromagnet. Pole pieces 11 and 12 are positioned in coaxial alignment, with their pole faces 15 opposite each other and parallel, and spaced apart a predetermined distance to provide the desired gap between pole faces. Thus, pole face 15 of pole piece 11 is positioned opposite a like pole face of pole piece 12, which is hidden from view in Fig. 1, the two pole faces 15 being contoured alike, and constituting mirror images of each other. The contour of pole face 15 in pole piece 11 serves to illustrate both. Pole pieces 11 and 12 are cylindrical as shown, and are of like diameter.

Each pole face 15 comprises the center area 16, which is flat and circular, and is concentric with its pole piece 11 or 12, and with the cylindrical surface 17 thereof. Center area 16 does not extend to the edges of pole face 15, and to cylindrical surface 17, but instead embodies only a predetermined area of pole face at its axis, describing a concentric circle. For the purpose of determining the structure of pole pieces 11 and 12, and of their pole faces 15, center area 16 of each is considered the nominal plane of its pole face, and other portions of the area of the pole face are displaced with reference to the level of the center area 16.

Inwardly from the peripheral cylindrical surface 17 of pole piece 11, Fig. 2, the annular ridge 18 projects upwardly from the plane of the center area 16 of pole face 15. Inwardly from annular ridge 18, the annular groove 19 projects downwardly below the level of center area 16. Ridge 18 and groove 19 are concentric with reference to each other, and with reference to pole piece 11.

Together, ridge 18 and groove 19 constitue a set of irregular contours which depart from the plane of center area 16, and the ridge and groove extend radially inwardly in succession from the nominal diameter of the gap between pole pieces 11 and 12, which corresponds with the effective diameter of the pole pieces, as represented by line 21 in Fig. 3.

Because pole faces 15 of the two pole pieces 11 and 12 are mirror images of each other, and are alike, the gap between pole faces is reduced in the area of opposite ridges, such as 18, and is a departure from the nominal gap measured by the linear distance between opposite center areas 16. The characteristics of magnetic flux are modified by ridge 18 accordingly. Ridge 18 comprises the raised surface 20, which is displaced from the level of center area 16 upwardly, and reduces the gap between surfaces 20 of the two pole pieces 11 and 12 from the value of the nominal gap between center areas 16.

Curve 25, Fig. 3, illustrates the flux distribution of the magnet of the disclosure, in the cyclotron in which it is used. Ordinates indicate magnitudes of magnetic intensity in the mid-plane between center areas 16 of the two-pole faces 15. Values of the abscissa indicate radii. Ordinate values along curve 25 represent magnitudes of magnetic strength at the mid-plane, at radius values along the abscissa, these radius values pertaining to the gap between pole faces 15, and corresponding also with radius values of the physical structure of pole pieces 11 and 12.

It will be observed in curve 25 that magnetic intensity is maximum at the axis of the gap corresponding with the axis of pole pieces 11 and 12. In radial directions away from the axis, magnetic intensity diminishes somewhat, and this diminution is at a progressively uniform rate to the point 26, where intensity falls off sharply to the point 27 and beyond, at a progressively increasing rate. This is illustrated by the straight-line contour of curve 25 to the left of point 26 in Fig. 3, and the curvilinear contour to the right of point 26.

In addition to sufficient magnetic strength in the cyclotron in which the magnet is used, the magnetic field should be monotone decreasing, i. e., radially away from the axis, magnetic intensity should be controlled to decrease slightly, and at a uniform rate that is predetermined according to performance requirements, to the peripheral edges of the gap, or as near thereto as is attainable. In a magnet embodying flat pole faces, its curve that corresponds with curve 25 of Fig. 3 is curvilinear throughout and a point which corresponds with point 26 is at or near the axis of the pole pieces. At the physical edges of a magnet comprising flat pole faces, flux density is negligible and ineffective, and even may be objectionable. In addition, the nominal diameter of the gap is much less than the physical diameter of the pole pieces, and a large percentage of the material of the pole pieces at their edges is ineffective.

One effect of the annular ridge 18 is to position point 26 along curve 25 nearer to the nominal edges of the gap, as indicated by line 21 in Fig. 3. This also operates to reduce the curvature of the curve 25 inwardly from point 26 towards the axis, which controls flux distribution more nearly in accordance with the magnetic characteristics desired in the magnet for use in the cyclotron, to derive optimum efficiency therefrom.

The present invention constitutes the discovery that annular grooves, such as 19, operate also to improve control of flux distribution in the gap between pole faces 15. Adjacent to annular ridge 18 at a small diameter, groove 19 serves to position point 26 nearer to line 21 along curve 25 in Fig. 3, and also to straighten curve 25 additionally to the left of point 26 in Fig. 3. Ridge 18 provides corrective control of flux distribution in the gap between pole faces 15, to approach optimum magnetic characteristics for operational requirements, and groove 19 operates additionally for the same purpose to introduce corrective control of flux distribution directed to desired corrective controls remaining to be obtained, and which are not attained by ridge 18. Groove 19 comprises the depressed surface 29, which is displaced downwardly from the level of center area 16, displacement of surface 29 in groove 19 in the downward direction being less than the upward displacement of raised surface 20 of ridge 18.

The physical edges of both pole pieces 11 and 12 are chamfered at 30, between the effective diameter indicated by line 21 in Fig. 3 and the physical diameter of cylindrical surface 17. This causes field intensity to fall off more sharply from the point 26 of curve 25 to the nominal diameter of the gap indicated by line 21. In another sense, this reduces the undesirable flux in the edge area of the gap, and it operates to bring the effective diameter at 21 of pole pieces 11 and 12 more nearly in conformance with the physical diameter of cylindrical surface 17.

Additional sets of concentric annular ridges and grooves, in alternation at progressively diminishing diameters, add to improvement of the magnetic characteristics of the magnet, and enable more precise control of flux distribution. Each succeeding ridge adjacent to a groove of larger diameter, and each succeeding groove adjacent to a ridge of larger diameter, improves magnetic characteristics and approaches more perfect flux distribution, according to laws of diminishing return, and until no practical advantage is attained from additional irregularity in the pole faces. Practical advantage is insignificant from more than three concentric ridges, with a groove between adjacent ridges.

Accordingly, the magnet disclosed in the drawing comprises the ridge 31 at a smaller diameter next adjacent to groove 19, groove 32 at a smaller diameter next adjacent to ridge 31, and ridge 33 at a smaller diameter next adjacent to groove 32. Ridge 31 comprises the raised surface 34, which is displaced upwardly from the level of center area 16, by an amount less than the downward displacement of depressed surface 29 of groove 19. The depressed surface 35 of groove 32 is displaced downwardly from the nominal level of pole face 15 by an amount less than the upward displacement of surface 31.

Raised surface 36 of ridge 33 is displaced upwardly from the level of center area 16 by an amount that is less than depressed surface 35 is displaced from the level of area 16.

In addition to improved magnetic characteristics, and increased flexibility in the control of flux distribution, the present invention enables a saving of materials, both in the pole pieces and in the electrical coil windings therefor. In the pole pieces alone, for the cyclotron in which the invention was embodied, hundreds of tons of steel were saved. The increased efficiency is a more important factor, however. The shape of the field near the edges of the poles derived from applicant's structure makes the problem of extracting ions from the cyclotron simpler than with structures available from prior-art teachings.

The disclosed structure presents one practical embodiment of the invention, the scope of which is determined by the accompanying claims.

I claim:

1. In the poles of a magnet comprising pole faces of opposite polarity positioned face-to-face and separated by a gap, the pole faces comprising each a flat area constituting the nominal plane of the pole face and the several pole faces being positioned with their flat areas parallel to each other, the several pole faces being contoured irregularly in mirror image with reference to each other, the irregular contour of each pole face comprising a set consisting of an annular ridge and an annular groove adjacent to each other and near the periphery of the pole, the annular ridge describing a greater diameter on the pole face than the annular groove of its set, the annular ridge comprising a raised surface which is displaced upwardly from the level of the nominal plane of the pole face by a predetermined amount, the annular groove comprising a depressed surface which is displaced downwardly from the level of the nominal plane of the pole face by a predetermined lesser amount than the raised surface of its next adjacent ridge of greater diameter is displaced upwardly.

2. In pole of a magnet as defined in claim 1, a plurality of sets of alternate annular ridges and grooves arranged adjacent to each other in succession and in progressively diminishing diameters on the pole face, each ridge that is adjacent to a groove of greater diameter comprising a raised surface which is displaced upwardly from the level of the nominal place of the pole face by a predetermined amount less than the depressed surface of its next adjacent groove of greater diameter is displaced downwardly, and each groove comprising a depressed surface which is displaced downwardly from the level of the nominal plane of the pole face by a predetermined amount less than the raised surface of its next adjacent ridge of greater diameter is displaced upwardly.

References Cited in the file of this patent

UNITED STATES PATENTS

| 2,586,494 | Wideroe | Feb. 19, 1952 |
| 2,673,251 | Duncan | Mar. 23, 1954 |
| 2,680,811 | Guenard et al. | June 8, 1954 |

OTHER REFERENCES

"Field Measurements on Model Betatron and Synchrotron Magnets," by E. A. Finlay et al., Journal of Scientific Instruments, October 1950, vol. 27, pp. 264–270.